Dec. 11, 1928.
C. W. STEVENS
1,694,404
LUBRICATED ADJUSTABLE PLUG VALVE
Filed July 9, 1926
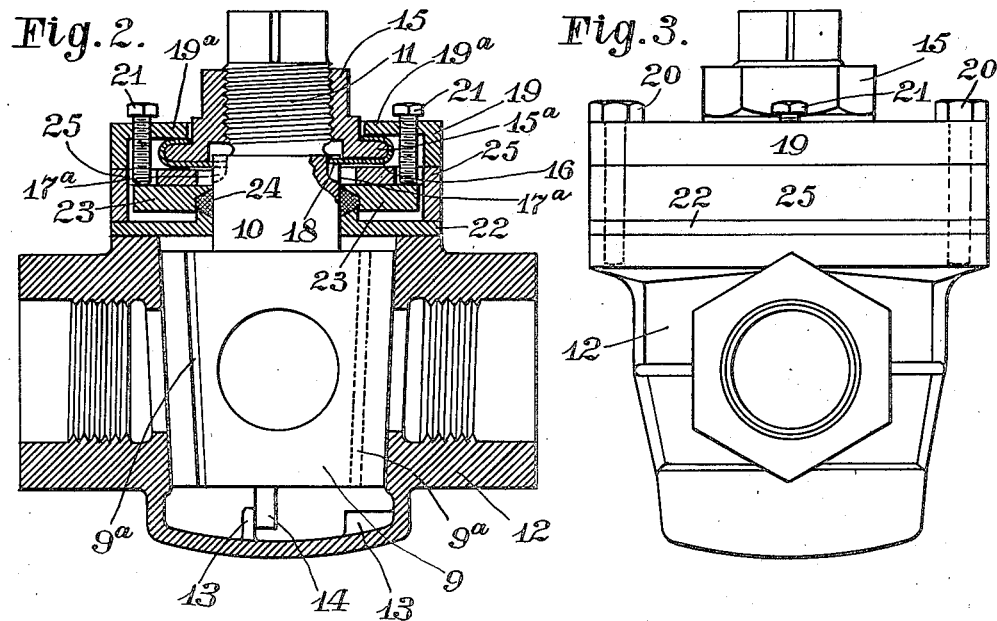
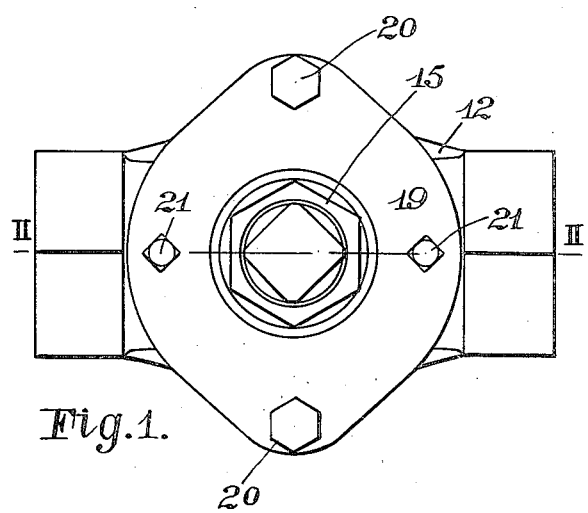
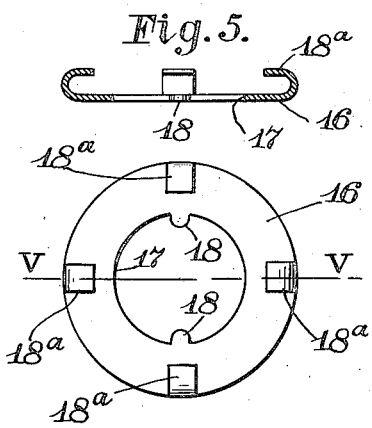
Inventor
CHARLES W. STEVENS
by Fincral Fincral
his attorneys Patented Dec. 11, 1928.

1,694,404

UNITED STATES PATENT OFFICE.

CHARLES W. STEVENS, OF BEXLEY, OHIO.

LUBRICATED ADJUSTABLE-PLUG VALVE.

Application filed July 9, 1926. Serial No. 121,359.

The principal object of this invention is to provide improved and simplified means whereby the plug portion of a rotary valve can be raised or lowered so that the fit of the plug may be nicely regulated or the plug released in case it sticks. Another object of the invention is to provide improved means for making the valve fluid-tight between the adjusting means and the plug. A third object is to provide improved means whereby a washer employed in the construction is at certain times held stationary with respect to an adjusting nut employed for raising and lowering the valve plug. Another object is the provision of improved means for packing the valve. Other objects will appear from the discrosure herein.

The invention is embodied in the example herein shown and described, the features of novelty being finally claimed.

In the accompanying drawing—

Figure 1 is a top plan view.

Fig. 2 is a vertical section on the line II—II Fig. 1, with the plug mainly in full lines.

Fig. 3 is an elevation looking toward the left hand side of Fig. 2.

Fig. 4 is a plan view of the washer.

Fig. 5 is a central section of the same on the line V—V Fig. 4.

In the views 9 designates a tapered and ported plug, it having formed therewith a spindle including a cylindrical portion 10 and a threaded portion 11.

12 designates the valve casing or connection which is provided with an appropriate socket containing a seat for the plug and suitable stops 13 at the bottom engaged by a pin, such as shown at 14, on the lower end of the plug to limit the rotation of the plug to open and closed positions.

15 designates a nut threaded to properly engage the threaded portion of the stem of the plug, said nut having at its lower end a circular flange 15ª. Carried by the flange of the nut is a washer 16 made with a central hole 17 and having teats 18 projecting inwardly from the edge forming said opening to engage recesses 17ª in the upper end of cylindrical portion 10 of the stem of the plug. These teats 18 prevent the washer from turning with reference to the stem when the nut 15 is turned on the threaded portion thereof to raise or lower the plug. Said teats also cause the washer to turn with the plug. This construction avoids flattening the threaded stem for the purpose of engaging the washer therewith. The outer edge of the washer is provided with several tongues 18ª bent up around the flange 15ª to couple the washer with the nut so that when the nut is raised or lowered on the threaded portion of the stem the washer is carried with it. The recesses 17ª are made of a sufficient depth to provide for any needed movement of the nut in the operation.

19 designates a cap provided centrally with a circular opening large enough to receive the nut with its wrench receiving end exposed and permit it to be turned on the stem. This cap is secured to the casing or connection by means of screw bolts as shown at 20, said bolts engaging the casing. The cap 19 around its central opening is formed as a lip 19ª that overlies the flange of the nut.

Surmounting the casing around the opening of the plug-seat is a ring 22, the inner end of which, where it fits around the cylindrical portion of the stem, is formed with a beveled flange constituting one side of a packing seat. The other side of the packing seat is formed at the inner edge of a flat ring 23. The character 24 designates the packing in the seat referred to. The ring 23 is pressed by set screws 21 tapped through the cap 19, said screws being adjustable to more or less squeeze the packing against the stem to insure fluid tightness. Lying on top of the ring 23 below the cap 19 is another ring 25 adapted to take the pressure of the nut 15 and its washer when said nut is turned to raise the valve plug. The ends of the set screws are passed through holes in the horizontal portion of the ring 25.

The character 9ª designates grooves permitting lubrication of the bearing of the plug when turned, the cavities above and below the plug being filled with lubricant when the plug is installed and left. The raising and lowering of the plug forces the lubricant through the grooves from one end of the plug to the other.

The operation is this: When the nut 15 is turned in one direction, say to press the plug down, it eventually presses against the lower side of the cap 19 which then forms a purchase to force the plug downward, and when said nut 15 is turned in the opposite direction it eventually presses downward against the ring 25 which, because supported in the casing, forms a purchase for drawing the plug upward. In these operations it will be borne in mind that the nut 15 turns in the cap and washer, the later being held from turning because the teats engage the stem. The valve plug 9 can be turned to open or closed position with respect to the gas or liquid passage in the casing by applying a wrench or suitable handle to the upper squared and exposed end of the stem and such turning does not affect the position of the nut but only of the washer engaged therewith, the later, when the plug and its stem are turned, turning with the plug as before suggested and thereby leaving the nut in its adjusted position.

It will be noted that when the stem is turned to open or close the valve the washer 16, being keyed to the stem, prevents the nut from changing its position on the stem because, when the stem is thus turned, it carries with it both the nut and the washer. The appropriate one of the stops 13, 13, at the lower end of the casing for limiting the rotation of the valve plug to open or closed position, as before described, also serves to hold said plug from rotation by contact of the pin 14 on the plug when the nut 15 is turned to raise or lower the plug.

In this construction the packing is not subjected to pressure when the valve is either open or closed because the plug can then be forced into its seat by operating the nut. In opening or closing a large plug it is expedient to first raise and thereby release the plug from its seat and hence facilitate turning the plug. It is only upon the operation just described that the packing is subjected to pressure. It will be observed that the packing can be adjusted independently of the nut for raising and lowering the plug.

The forms of the parts can be changed without departing from the gist of the invention as claimed.

What I claim is:

1. In combination with a valve casing having a tapered valve seat, a rotary plug therein having a threaded stem and an exposed end whereby the plug may be turned, a flanged nut on said threaded stem, a washer carried by a flange of the nut, a teat on said washer engaging a recess in the stem, a cap on said casing affording a purchase for said flange when the nut is turned in one direction, the wall of the casing affording a purchase for said flange of the nut when the nut is turned in the opposite direction.

2. In combination with a valve casing having a tapered valve seat, a rotary plug therein having a stem provided with a cylindrical portion next the plug, a threaded portion therebeyond, and an exposed end whereby the plug may be turned, a flanged nut on said threaded portion also having an exposed end whereby said nut may be turned, a cap secured on said casing affording a purchase for a flange of the nut when the nut is turned in one direction, means forming a packing in one direction, means forming a packing in one direction around the cylindrical portion of the seat around the cylindrical portion of the stem, said means including a beveled ring on the casing and a movable beveled ring cooperating with said casing, a second ring supported by the casing and inclosing said movable ring and forming a purchase for said flange when the nut is turned in the opposite direction, and set screws engaging the cap and extended through said enclosing ring to exert pressure on said movable beveled ring.

3. In combination with a valve casing having a tapered plug seat and a passage in the casing thereinto, a rotary plug in said casing having a stem provided with a cylindrical portion next the said plug, a threaded portion above the cylindrical portion and a wrench receiving end beyond the threaded portion whereby the plug may be turned, a nut on the threaded portion of said stem, said nut having a flange and a portion whereby the nut may be turned, a ring (22) having a packing seat surmounting the casing around said passage into the plug seat and fitting around the cylindrical portion of the stem, and a complementing ring (23) superimposed on said first mentioned ring, a packing between said rings, a ring (25) angular in cross section and including a horizontal web, said ring superimposed on the first mentioned ring and inclosing the second mentioned ring, the horizontal web of said ring (25) being perforated and extending beneath said flange of the nut and affording a purchase therefor in separating the plug from its seat, a cap ring (19) angular in cross section and including a vertical and horizontal web, said ring superimposed on the first mentioned angular ring (25) and having its horizontal web provided with threaded perforations and extending over the upper side of the flange of the nut and affording a purchase for said nut in moving said plug into its seat, means securing said rings to the valve casing, and set screws threaded in the perforations of said cap ring and extending through the perforations of ring 25 and engaging the ring 23 to adjust the packing between said rings 22 and 23, substantially as described.

CHARLES W. STEVENS.